(12) United States Patent
Fujiwara et al.

(10) Patent No.: US 12,471,576 B2
(45) Date of Patent: Nov. 18, 2025

(54) TEST FISH HOLDING DEVICE AND TEST FISH TREATMENT METHOD

(71) Applicant: KOBELCO ECO-SOLUTIONS CO., LTD., Kobe (JP)

(72) Inventors: Naomi Fujiwara, Kobe (JP); Shiro Toyohisa, Kobe (JP); Yukiko Nakajima, Kobe (JP)

(73) Assignee: KOBELCO ECO-SOLUTIONS CO., LTD., Kobe (JP)

( * ) Notice: Subject to any disclaimer, the term of this patent is extended or adjusted under 35 U.S.C. 154(b) by 0 days.

(21) Appl. No.: 18/842,993

(22) PCT Filed: Sep. 26, 2023

(86) PCT No.: PCT/JP2023/034836
§ 371 (c)(1),
(2) Date: Aug. 30, 2024

(87) PCT Pub. No.: WO2024/080129
PCT Pub. Date: Apr. 18, 2024

(65) Prior Publication Data
US 2025/0107512 A1  Apr. 3, 2025

(30) Foreign Application Priority Data

Oct. 14, 2022 (JP) ................................. 2022-165476

(51) Int. Cl.
*A01K 61/95* (2017.01)
*A61D 7/00* (2006.01)

(52) U.S. Cl.
CPC ............... *A01K 61/95* (2017.01); *A61D 7/00* (2013.01)

(58) Field of Classification Search
CPC . A61D 3/00; A61D 7/00; A61D 19/00; A01K 1/0613; A01K 61/95; A01K 63/00; A01M 23/02
See application file for complete search history.

(56) References Cited

U.S. PATENT DOCUMENTS 6,145,476 A  11/2000 Tempel
10,412,928 B1 *  9/2019 Qamar .................... A61D 3/00
(Continued)

FOREIGN PATENT DOCUMENTS

JP  1982045946 U  3/1982
JP  H04179420 A  6/1992
(Continued)

*Primary Examiner* — Laura A Bouchelle
(74) *Attorney, Agent, or Firm* — The Webb Law Firm

(57) ABSTRACT

Provided is a technology which can properly perform a predetermined treatment on an abdomen of a test fish while reliably holding the test fish in a predetermined posture by suppressing damage as much as possible. A test fish holding device includes a flexible holder, the holder having a holding groove extending along a front-rear direction on an upper surface side and internally holding the test fish loaded from an upper opening portion. The holder has a slit extending along the front-rear direction in a bottom portion of the holding groove and exposing the abdomen of the test fish held inside the holding groove through a lower surface side. A width of the slit is widened by generating a tensile force from an inside toward an outside on the lower surface side of the holder.

7 Claims, 13 Drawing Sheets

(56) References Cited

U.S. PATENT DOCUMENTS

| | | |
|---|---|---|
| 2006/0081192 A1 | 4/2006 | Massey et al. |
| 2011/0168107 A1* | 7/2011 | Yaniv .................. A01K 1/0613 119/751 |
| 2024/0156066 A1 | 5/2024 | Fujiwara et al. |

FOREIGN PATENT DOCUMENTS

| | | |
|---|---|---|
| JP | H072322 U | 1/1995 |
| JP | 2008110260 A | 5/2008 |
| WO | 2022210397 A1 | 10/2022 |

* cited by examiner

TEST FISH HOLDING DEVICE AND TEST FISH TREATMENT METHOD

CROSS REFERENCE TO RELATED APPLICATIONS

This application is the United States national phase of International Patent Application No. PCT/JP2023/034836 filed Sep. 26, 2023, and claims priority to Japanese Patent Application No. 2022-165476 filed Oct. 14, 2022, the disclosures of which are hereby incorporated by reference in their entireties.

BACKGROUND

Field of the Disclosure

The present invention relates to a test fish holding device including a flexible holder, the holder having a holding groove extending along a front-rear direction on an upper surface side and internally holding a test fish loaded from an upper opening portion, and a test fish treatment method for performing a predetermined treatment on an abdomen of the test fish by using the test fish holding device.

Description of Related Art

In recent years, a zebrafish has attracted a great deal of attention as an experimental animal. In an animal experiment using a test fish such as the zebrafish, for example, an important issue is as follows. In holding the test fish when a predetermined treatment such as an intraperitoneal administration is performed on the test fish, damage to the test fish needs to be minimized, that is, damage to a body surface or the like of the test fish needs to be prevented. Without causing a symptom of a burn, the test fish needs to be held as gently as possible.

Therefore, in the related art, a fish holder has been proposed in which a synthetic resin plate is bent into a U-shape and a flexible material such as sponge and nonwoven fabric is affixed to an inner surface side for holding the test fish (for example, refer to PTL 1).

CITATION LIST

Patent Literature

[PTL 1] Japanese Registered Utility Model No. 3051118

In performing the predetermined treatment such as the intraperitoneal administration performed on the abdomen of the test fish, according to the fish holder disclosed in PTL 1, the test fish can be gently held by the flexible material. However, for example, when the test fish violently acts while the test fish is held, the test fish is inevitably held with a strong force, thereby causing a high possibility that the test fish may be damaged in some way.

In addition, in order to prevent the test fish from violently acting, it is conceivable to hold the test fish by performing an anesthesia on the test fish. In this case, it is unclear whether an experimental result illustrates that the test fish is affected by a target substance administered to the test fish or is affected by the anesthesia. Furthermore, in a case of an experiment in which the target substance is repeatedly administered, when the anesthesia is performed each time the target substance is administered, the test fish is repeatedly affected by the anesthesia. Therefore, it is not possible to make an experiment in which the target substance is repeatedly administered.

Furthermore, when the abdomen of the test fish is covered with the fish holder in performing the predetermined treatment such as the intraperitoneal administration on the abdomen of the test fish held by the fish holder, it is necessary to expose the abdomen of the test fish by rotating the test fish around a front-rear axis in a state where the test fish is held by the fish holder. However, in this rotation operation, there is a possibility that the test fish is severely damaged.

SUMMARY

In view of the above-described circumstances, a main object of the present disclosure is to provide a technology which can properly perform a predetermined treatment on an abdomen of a test fish while damage is suppressed as much as possible and the test fish is reliably held in a predetermined posture.

According to a first characteristic configuration of the present disclosure, there is provided a test fish holding device including a flexible holder. The flexible holder includes a holding groove extending along a front-rear direction on an upper surface side thereof and internally holding a test fish loaded from an upper opening portion. The holder has a slit extending along the front-rear direction in a bottom portion of the holding groove and exposing an abdomen of the test fish held inside the holding groove on a lower surface side thereof. A width of the slit is widened by generating a tensile force from an inside toward an outside on the lower surface side of the holder.

According to the present configuration, the test fish can be gently held inside the holding groove of the flexible holder. Even when the test fish violently acts, the test fish is unlikely to violently act since the test fish is held inside the holding groove, and as a result, damage to the test fish can be suppressed.

The slit is provided in the bottom portion of the holding groove in the holder. Therefore, a predetermined treatment such as an intraperitoneal administration using a test fish intraperitoneal administration tool can be easily and reliably performed on the abdomen of the test fish held inside the holding groove through the slit from the lower surface side.

Therefore, the present disclosure can provide a technology which can properly perform the predetermined treatment on the abdomen of the test fish while reliably holding the test fish in a predetermined posture by suppressing damage as much as possible.

According to a second characteristic configuration of the present disclosure, the holder is formed to have a groove forming portion in which the holding groove is formed, and a pair of side wing portions extending from a lower portion side to both sides of both left and right side portions of the groove forming portion.

According to the present configuration, the holder can perform a side wing portion bending operation for bending the pair of side wing portions in a form in which each outer end portion of the pair of side wing portions extending from a lower portion to both sides of both left and right side portions of the groove forming portion is moved to be close toward the upper surface side of the groove forming portion. When this side wing portion bending operation is performed, in the groove forming portion, the tensile force is generated from the inside toward the outside on the lower surface side, and a compressive force is generated from the outside toward the inside on the upper surface side.

Therefore, when the side wing portion bending operation is performed in a state where the test fish is held inside the holding groove of the groove forming portion, the width of the holding groove is reduced by the compressive force. In this manner, while the test fish held inside the holding groove is properly gripped by both side walls of the holding groove, the predetermined treatment can be easily and reliably performed on the abdomen of the test fish held inside the holding groove through the slit whose width is widened by the tensile force.

According to a third characteristic configuration of the present disclosure, a lower surface of the holder is formed in a planar shape, and the slit is provided to be open on the lower surface of the holder.

According to the present configuration, the slit is provided to be open on the lower surface formed in the planar shape in the holder. Therefore, the tensile force is generated from the inside toward the outside on the lower surface of the holder. In this manner, the width of the slit can be relatively largely widened by directly applying the tensile force to the slit, and the predetermined treatment can be more easily and reliably performed on the abdomen of the test fish held inside the holding groove through the slit whose width is relatively largely widened.

In particular, when the holder is formed to have the groove forming portion and the pair of side wing portions as described above, the lower surface of the groove forming portion and the lower surface of the pair of side wing portions are formed in the same planar shape. In this manner, the tensile force generated on the lower surface of the holder by performing the side wing portion bending operation is directly applied to the slit. Accordingly, the width of the slit can be more largely widened.

According to a fourth characteristic configuration of the present disclosure, the holding groove is formed to have a substantially isosceles triangular cross-sectional shape in which an opening portion is a vertex.

According to the present configuration, while the holder gently holds the test fish in a relatively wide space in a state where the test fish is held inside the holding groove formed in the substantially isosceles triangular cross-sectional shape in which the opening portion side is the vertex, the width of the opening portion becomes narrower than the width of the space. In this manner, the holder can preferably prevent the test fish from falling from the opening portion.

According to a fifth characteristic configuration of the present disclosure, there is provided a test fish treatment method for performing a predetermined treatment on an abdomen of a test fish by using the test fish holding device according to the present disclosure. The method includes holding the test fish inside the holding groove of the holder, and performing the predetermined treatment on the abdomen of the test fish held inside the holding groove through the slit from the lower surface side of the holder.

According to the present configuration, the predetermined treatment is performed on the abdomen of the test fish held inside the holding groove through the slit by using the test fish holding device according to the present disclosure. In this manner, the predetermined treatment can be properly performed on the abdomen of the test fish while the test fish is reliably held in a predetermined posture by suppressing damage as much as possible.

According to a sixth characteristic configuration of the present disclosure, the test fish treatment method further includes performing an intraperitoneal administration, by using a test fish intraperitoneal administration tool including a syringe filled with a target substance and an injection needle through which the target substance supplied from the syringe flows out from a tip, for administering the target substance into an abdominal cavity of the test fish through the injection needle, as the predetermined treatment, in a state where the injection needle is inserted into the abdomen of the test fish held inside the holding groove of the holder.

The injection needle is provided with an insertion depth guide portion in an outer peripheral portion of the injection needle, the insertion depth guide portion coming into contact with an abdominal surface of the test fish when the injection needle is inserted into the abdomen of the test fish at a predetermined reference insertion depth during the intraperitoneal administration.

According to the present configuration, in the test fish intraperitoneal administration tool for performing the intraperitoneal administration on the abdomen of the test fish as the predetermined treatment, the insertion depth guide portion is provided in the outer peripheral portion of the injection needle, based on the reference insertion depth. In this manner, during the intraperitoneal administration, when a user inserts the injection needle into the abdomen of the test fish, the insertion depth guide portion comes into contact with the abdominal surface of the test fish. Accordingly, the user can clearly recognize that the injection needle is inserted into the abdomen of the test fish at a proper reference insertion depth. Therefore, a stable intraperitoneal administration can be simply performed on the test fish at all times while reliably reducing a burden on the test fish which is caused by an error between an actual insertion depth of the injection needle into the abdomen of the test fish and the reference insertion depth.

According to a seventh characteristic configuration of the present disclosure, the insertion depth guide portion in the outer peripheral portion of the injection needle is provided in a form where the insertion depth guide portion is parallel to the abdominal surface of the test fish when the injection needle is inserted into the abdomen of the test fish at a predetermined reference insertion angle during the intraperitoneal administration.

According to the present configuration, when the user inserts the injection needle into the abdomen of the test fish, the user keeps a posture of the syringe such that the insertion depth guide portion is parallel to the abdominal surface of the test fish. In this manner, the user can clearly recognize that the injection needle is inserted into the abdomen of the test fish at a proper reference insertion angle. Therefore, a stable intraperitoneal administration can be simply performed on the test fish at all times while reliably reducing a burden on the test fish which is caused by an error between an actual insertion angle of the injection needle into the abdomen of the test fish and the reference insertion angle.

BRIEF DESCRIPTION OF THE DRAWINGS

The terms Fig., Figs., Figure, and Figures are used interchangeably in the specification to refer to the corresponding figures in the drawings.

DETAILED DESCRIPTION

[Test Fish Holding Device]

An embodiment of a test fish holding device according to the present disclosure will be described with reference to the drawings.

Figure 1:
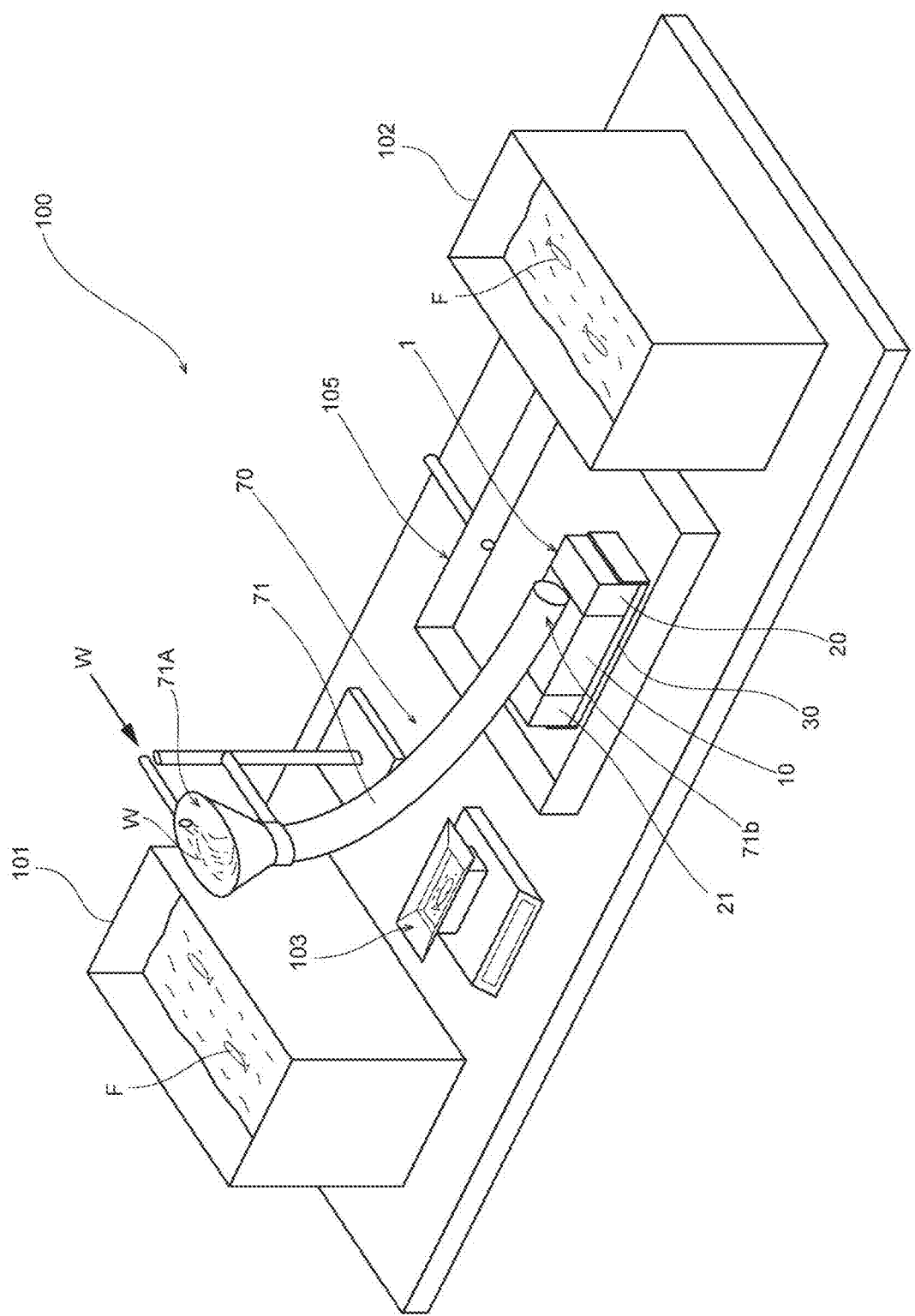
FIG. 1 is a schematic configuration diagram of a whole test fish treatment facility.
Figure 2:
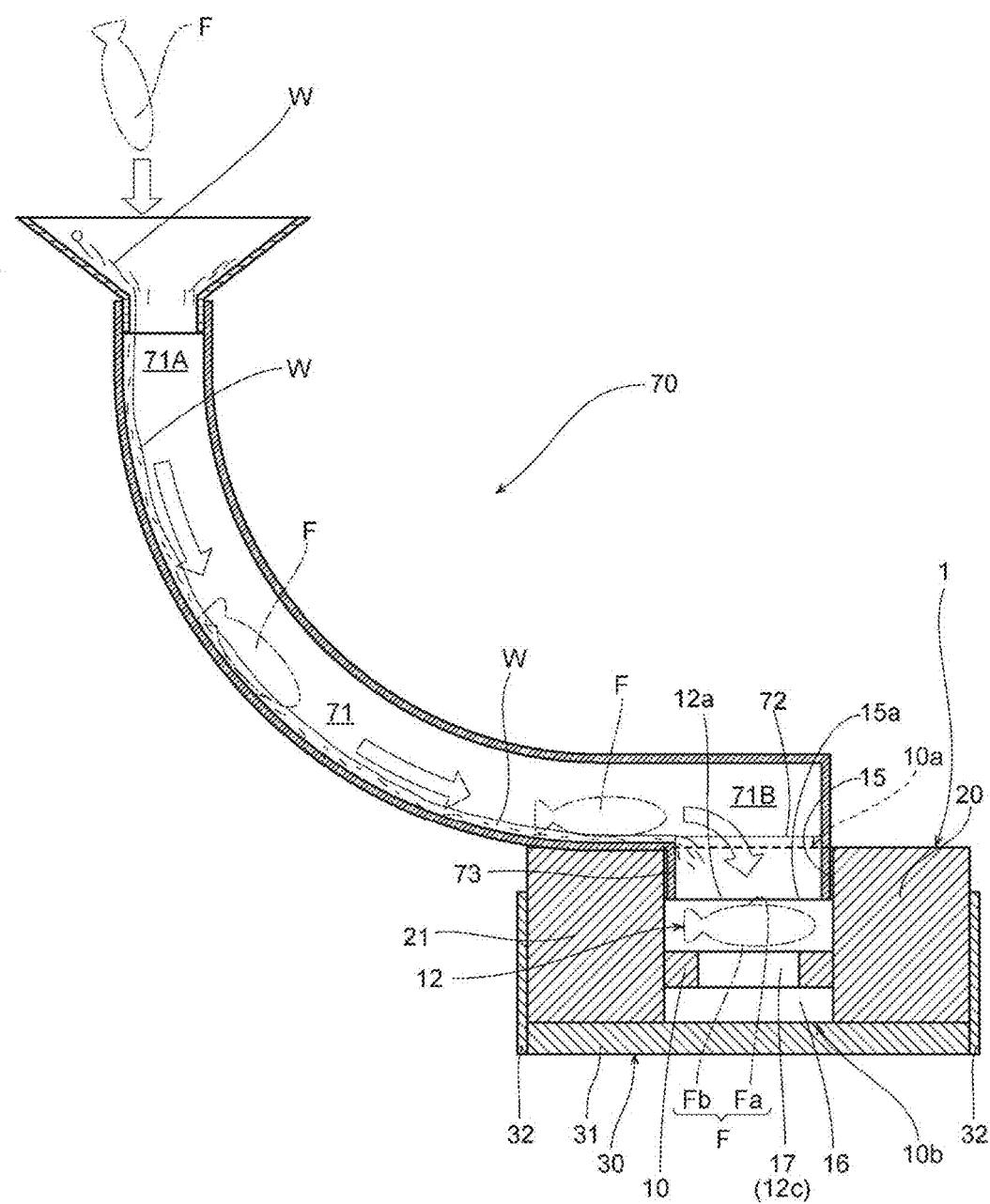
FIG. 2 is a cross-sectional view illustrating a state where a test fish are guided to a test fish holding device by a test fish guide device.
Figure 3:
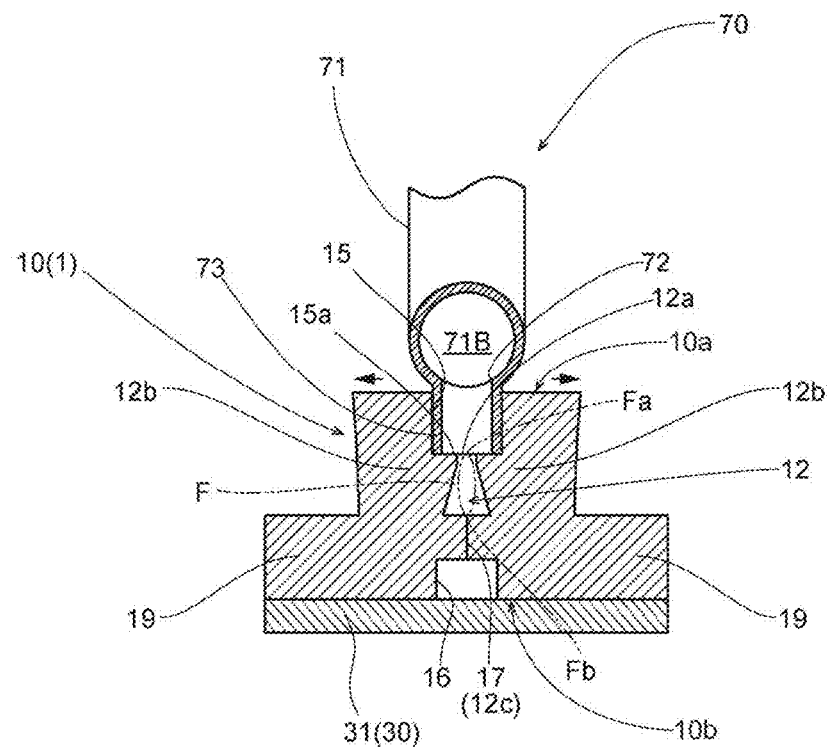
FIG. 3 is a cross-sectional view illustrating a state where a discharge chute of the test fish guide device is inserted into the holder.

As illustrated in FIGS. 1, 2 and 3, in a test fish treatment facility 100 (refer to FIG. 1) for holding a test fish F to perform various biological observations, biological experiments, and the like, a test fish holding device 1 of the present embodiment is configured to reliably hold the test fish F in a predetermined posture by suppressing damage to the test fish F as much as possible, the test fish F being relatively small and used for the biological experiments. Specifically, a flexible holder 10 is provided, and the holder 10 has a bottomed and upward opening holding groove 12 extending along a front-rear direction on an upper surface 10a side and internally holding the test fish F loaded from an upper opening portion 12a. The test fish F is held inside the holding groove 12 in a reasonable and natural state.

In the present embodiment, zebrafish is assumed as the test fish F, but the test fish F may be any small fish used for the biological experiment. For example, a fathead minnow, a killifish (rice fish), a guppy, or the like can be used as the test fish F.

As illustrated in FIG. 1, the test fish treatment facility 100 includes a first water tank 101 that accommodates the test fish F before being loaded into a loading portion 71A of the test fish guide device 70, and a second water tank 102 that accommodates the test fish F released from holding of the holder 10. In the vicinity of the first water tank 101 and the loading portion 71A of the test fish guide device 70, there is provided a weighing water tank 103, for example, such as a transparent beaker that temporarily accommodates the test fish F fetched from the first water tank 101 before the test fish F is loaded into the loading portion 71A. The weighing water tank 103 is placed on a weighing scale, and the weighing scale measures a weight of the test fish F accommodated in the weighing water tank 103. Water stored in the weighing water tank 103 is loaded into the loading portion 71A together with the test fish F.

In addition, the test fish treatment facility 100 is provided with a water receiving portion 105 in which the holder 10 is installed to receive the water discharged from a discharge portion 71B of the test fish guide device 70. Even when the test fish F discharged from the discharge portion 71B falls from the holder 10, the fallen test fish F can be accommodated in the water stored in the water receiving portion 105 without any burden.

A user can manually load the test fish F into the holding groove 12 of the holder 10. However, in the test fish treatment facility 100, a predetermined test fish guide device 70 is provided to reduce damage to the test fish F as much as possible.

As illustrated in FIG. 2, the test fish guide device 70 is provided with an inclined guide path 71 extending obliquely downward from the loading portion 71A to the discharge portion 71B. The test fish F is loaded into the loading portion 71A together with water W, and the test fish F loaded into the loading portion 71A is guided to the discharge portion 71B together with the water W through the inclined guide path 71. As illustrated in FIG. 3, the test fish F guided to the discharge portion 71B is discharged into the holding groove 12 of the holder 10 together with the water W, and the test fish F is held in the holding groove 12. In the present embodiment, an extending direction of the inclined guide path 71 will be referred to as a guide path extending direction, the discharge portion 71B side will be referred to as a front side when viewed from the loading portion 71A along the guide path extending direction, and the loading portion 71A side will be referred to as a rear side when viewed from the discharge portion 71B along the guide path extending direction. In addition, a dimension along the guide path extending direction in a plan view will be referred to as a length, and a dimension along a direction orthogonal to the guide path extending direction in a plan view will be referred to as a width.

In causing the holding groove 12 to hold the test fish F, in order to stably hold the test fish F in the holding groove 12 in a substantially horizontal posture while preventing the test fish F from falling from the holding groove 12, the test fish guide device 70 is provided with an discharge port 72 formed in a bottom portion of the discharge portion 71B in the inclined guide path 71, and a tubular discharge chute 73 extending downward from a peripheral edge portion of the discharge port 72.

That is, as illustrated in FIG. 2, the test fish F loaded into the loading portion 71A together with the water W flows through the inclined guide path 71 together with the water W, is brought into a substantially horizontal posture along the guide path extending direction, and is guided to the discharge portion 71B in a state where the horizontal posture is maintained. The test fish F guided to the discharge portion 71B falls from the discharge port 72 formed in the bottom portion of the inclined guide path 71 while maintaining the substantially horizontal posture, passes through the inside of the discharge chute 73, and is discharged from a lower end opening portion of the discharge chute 73 toward the holding groove 12 of the holder 10. In this manner, as illustrated in FIG. 3, the test fish F discharged through the inside of the discharge chute 73 enters the holding groove 12 extending in a horizontal direction along the guide path extending direction in the holder 10 in a vertical direction while maintaining the substantially horizontal posture, and the test fish F is reliably held in the holding groove 12 in the substantially horizontal posture in which a back portion Fa is set as an upper side and an abdomen Fb is as a lower side.

The holder 10 is formed of a material having flexibility, water permeability, and water retention, for example, such as a sponge. In the present embodiment, the whole holder 10 is formed of the sponge, but the holder 10 can also be formed of another material having flexibility, water permeability, and water retention, for example, such as a nonwoven fabric.

Figure 5:
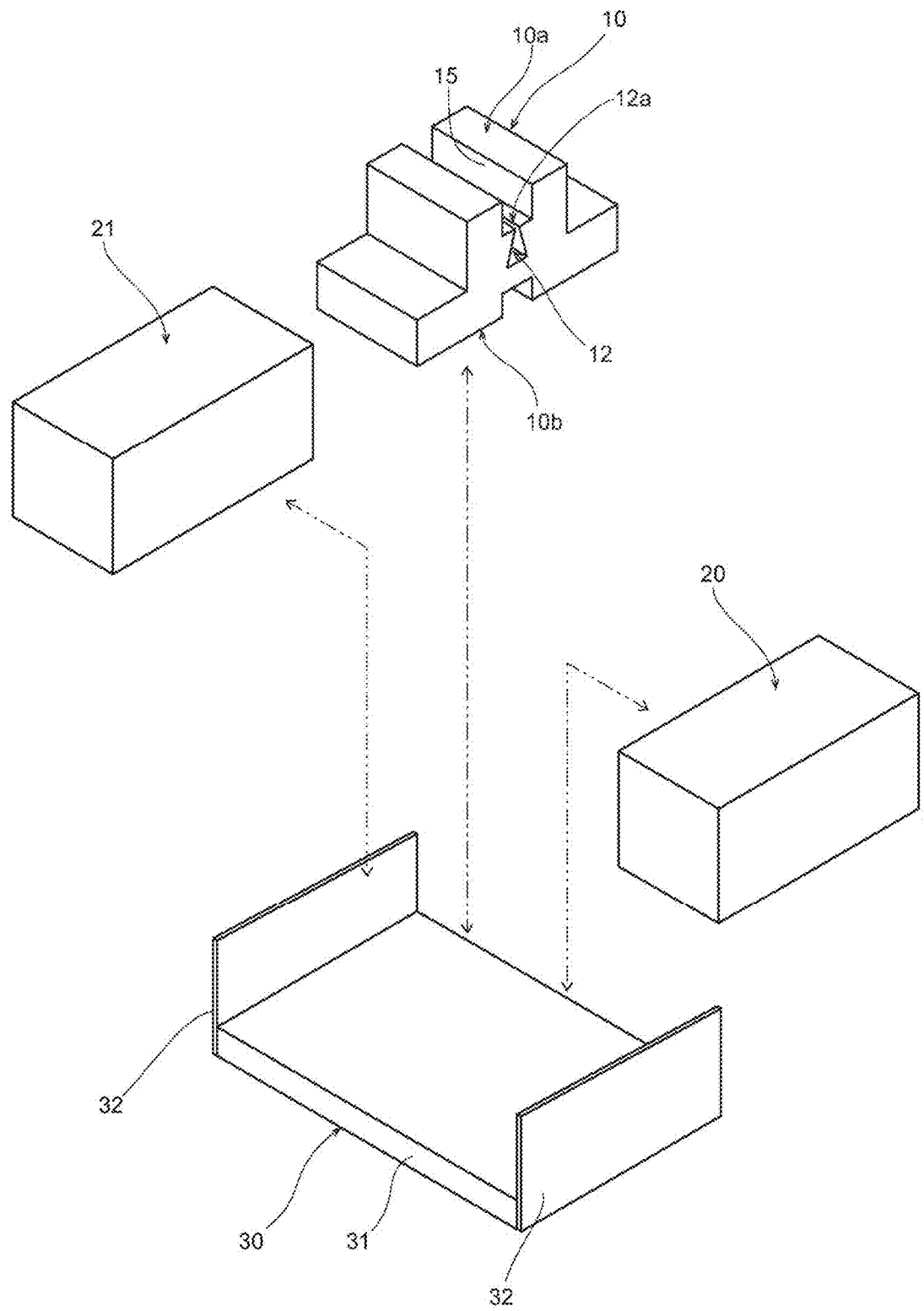
FIG. 5 is a perspective view illustrating a state where the holder and the front/rear closing tools are separated from the frame body in the test fish holding device.

As illustrated in FIG. 5, a shape of the holder 10 is formed in a rectangular shape in a plan view, and is formed in a substantially protruding shape in which the width on the upper surface 10a side is smaller than the width on the lower surface 10b side in a view in the guide path extending direction (refer to FIG. 3). The holding groove 12 serving as a groove extending in the guide path extending direction, opened by an opening portion 12a having a substantially linear upper shape, and having lower a space serving as an accommodation portion for accommodating the test fish F is formed on the upper surface 10a side of the holder 10.

In the holder 10, the holding groove 12 is provided in a total length from a rear end to a front end of the holder 10 such that the length along the guide path extending direction is longer than a total length (length from a mouth tip to a rear end of a tail) of the test fish F. For example, when the test fish F is a zebrafish having the total length of approximately 40 mm, it is desirable that the length of the holding groove 12 is set to be approximately 50 mm.

A depth of the holding groove 12 is slightly larger than a height of the test fish F in the vertical direction. For example, when the test fish F is the zebrafish having the total length of approximately 40 mm, it is desirable that the depth of the holding groove 12 is set to fall within a range of 5 to 25 mm.

A chute insertion recessed portion 15 into which the discharge chute 73 is inserted from above is formed on the upper surface 10a side of the holder 10, and the holding groove 12 is formed in a bottom portion 15a of the chute insertion recessed portion 15. That is, as illustrated in FIGS. 2 and 3, the tubular discharge chute 73 extending downward from the peripheral edge portion of the discharge port 72 formed in the bottom portion of the discharge portion 71B of the inclined guide path 71 is inserted into the chute insertion recessed portion 15 formed in the holder 10, and a lower end opening portion of the discharge chute 73 abuts on the bottom portion 15a of the chute insertion recessed portion 15. Since the discharge chute 73 is inserted into the chute insertion recessed portion 15 in this way, the test fish F discharged through the inside of the discharge chute 73 is prevented from falling outward from the holder 10. Furthermore, the holder 10 is simply disposed at a proper position with respect to the test fish guide device 70 by only inserting the discharge chute 73 into the chute insertion recessed portion 15. According to these configurations, the test fish F discharged from the inside of the discharge chute 73 reliably enters the holding groove 12 formed in the bottom portion 15a of the chute insertion recessed portion 15.

The width of the chute insertion recessed portion 15 along a direction orthogonal to the guide path extending direction in a plan view is set to be slightly smaller than the width of the discharge chute 73 along the same direction. Therefore, as illustrated in FIG. 3, when the discharge chute 73 having the slightly larger width is inserted into the chute insertion recessed portion 15, side wall portions 12b on both left and right sides of the holding groove 12 in the holder 10 are pushed and widened to the left and right, and the width of the holding groove 12 formed between the side wall portions 12b is slightly pushed and widened to the left and right. Then, in this state, the test fish F discharged through the inside of the discharge chute 73 can smoothly enter the holding groove 12 of the holder 10.

Figure 4:
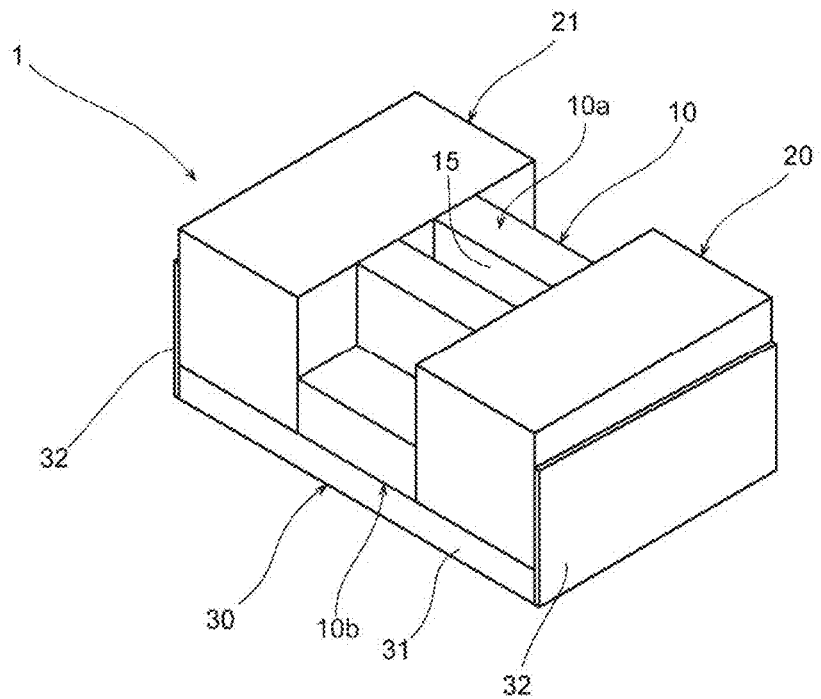
FIG. 4 is a perspective view illustrating a state where a holder and front/rear closing tools are set in a frame body in the test fish holding device.

As illustrated in FIGS. 1 and 2, in the test fish treatment facility 100, when the holder 10 is attached to and installed in the discharge chute 73, a front closing tool 20 and a rear closing tool 21 are installed on the front and rear sides of the holder 10. That is, as illustrated in FIGS. 4 and 5, the front closing tool 20 is installed to be separable from the holder 10 on the front side of the holder 10 in a state of closing a front side opening portion of the holding groove 12, and the rear closing tool 21 is installed to be separable from the holder 10 on the rear side of the holder 10 in a state of closing a rear side opening portion of the holding groove 12. The front closing tool 20 and the rear closing tool 21 have a substantially rectangular parallelepiped shape in which an upper end surface has substantially the same height as the upper surface of the holder 10, and are formed of a material having flexibility, water permeability, and water retention, for example, such as the sponge, in the same manner as the holder 10.

In the test fish treatment facility 100, in installing the front closing tool 20 and the rear closing tool 21 on the front and rear sides of the holder 10, a holder base 30 for holding the front closing tool 20 and the rear closing tool 21 at accurate positions with respect to the holder 10 is provided. The holder base 30 is formed by integrating the holder 10, a bottom plate 31 that covers an entire bottom surface of the front closing tool 20 and the rear closing tool 21 which are disposed on the front and rear sides of the holder 10, and front and rear wall plates 32 extending upward from the front and rear sides of the bottom plate 31 along a front surface of the front closing tool 20 and a rear surface of the rear closing tool 21. Therefore, when the holder 10, the front closing tool 20, and the rear closing tool 21 are placed on the bottom plate 31 of the holder base 30, the front and rear sides thereof are sandwiched between the wall plates 32, and the front closing tool 20 and the rear closing tool 21 are held at the accurate positions with respect to the holder 10.

In the test fish treatment facility 100, the holder 10, the front closing tool 20, and the rear closing tool 21 are installed in a state of being held by the holder base 30, and the discharge chute 73 of the test fish guide device 70 is inserted into the chute insertion recessed portion 15 of the holder 10. Then, the test fish F discharged through the inside of the discharge chute 73 and entering the holding groove 12 is prevented from falling outward from the front and rear opening portions. In the holder base 30, the front closing tool 20 and the rear closing tool 21 do not need to be attached and detached, except for the holder 10 that needs to be attached and detached. Therefore, the front closing tool 20 and the rear closing tool 21 may be simply placed on the bottom plate 31, but may be appropriately fixed by adhesion, a double-sided tape, or the like.

The holder 10 adopts a configuration for properly performing a predetermined treatment such as the intraperitoneal administration on the abdomen Fb of the test fish F held in the holding groove 12, and details thereof will be described below.

As illustrated in FIGS. 2 and 3, the holder 10 is provided with a slit 17 in the bottom portion 12c of the holding groove 12. The slit 17 extends along the front-rear direction which is the same as the extending direction of the holding groove 12 through a substantially central portion in a width direction in the bottom portion 12c of the holding groove 12, and is formed such that the slit 17 is not provided in a portion on the front and rear sides of the holding groove 12 and the length in the front-rear direction is slightly shorter than the length of the holding groove 12.

Figure 20:
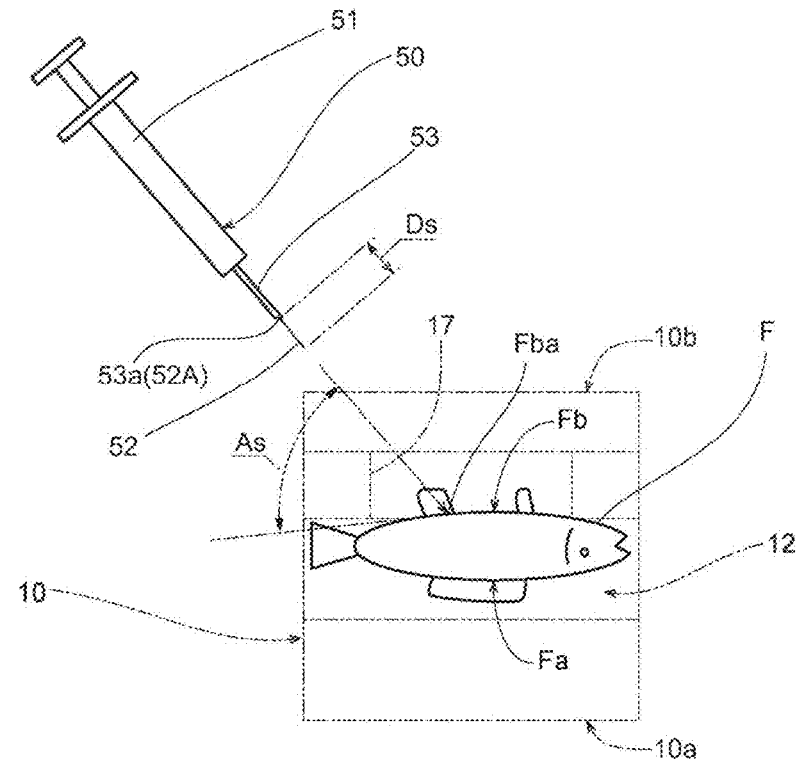
FIG. 20 is a view illustrating an overall configuration of an intraperitoneal administration tool and a state of an intraperitoneal administration.

The abdomen Fb of the test fish F held inside the holding groove 12 can be exposed to the lower surface 10b side through the slit 17 provided in this way. Therefore, although details will be described later, as illustrated in FIG. 20, the predetermined treatment such as the intraperitoneal administration using the test fish intraperitoneal administration tool 50 can be easily and reliably performed on the abdomen Fb of the test fish F held inside the holding groove 12 through the slit 17 from the lower surface 10b side.

As the holder 10 in which the slit 17 and the like are formed, a holder 10A (refer to FIGS. 6 to 11) of a first embodiment, a holder 10B (refer to FIGS. 12 to 16) of a second embodiment, and a holder 10C (refer to FIGS. 17 to 19) of a third embodiment, which have different cross-sectional shapes, can be adopted. Hereinafter, detailed configurations of the holders 10A, 10B, and 10C according to the first to third embodiments will be described.

First Embodiment

Figure 6:
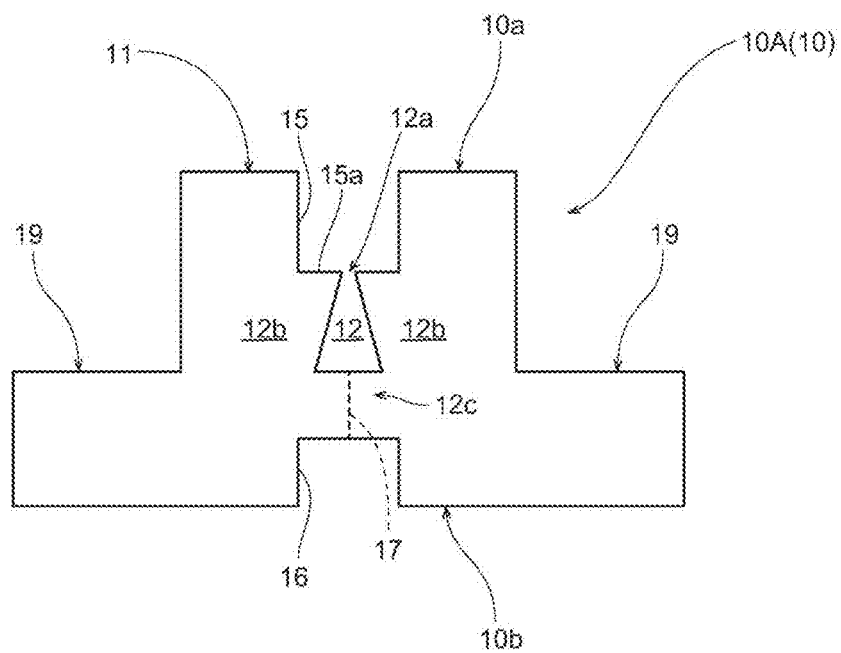
FIG. 6 is a front view of the holder of a first embodiment.
Figure 7:
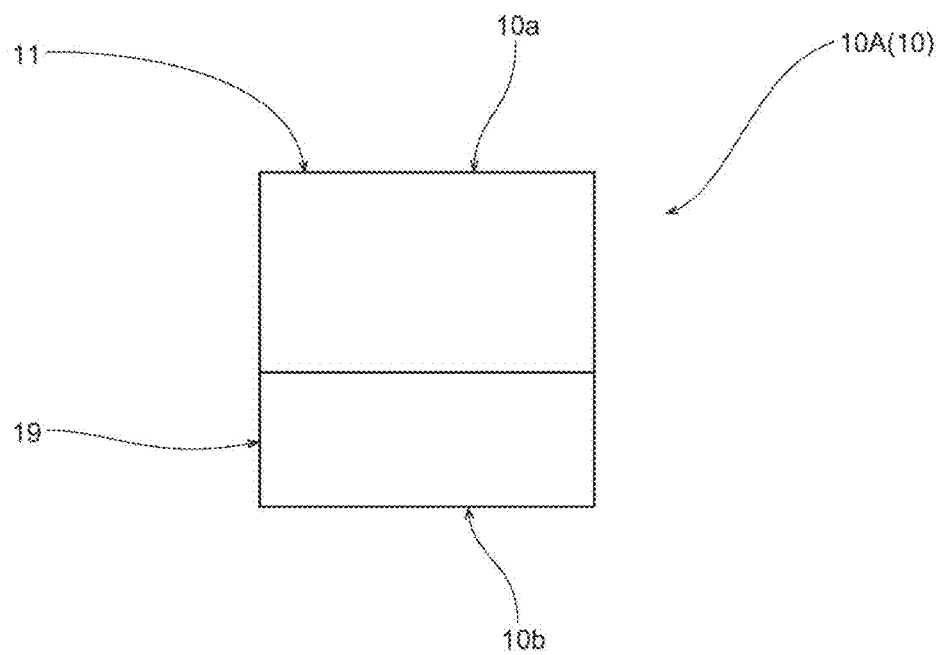
FIG. 7 is a left side view of the holder of the first embodiment.
Figure 8:
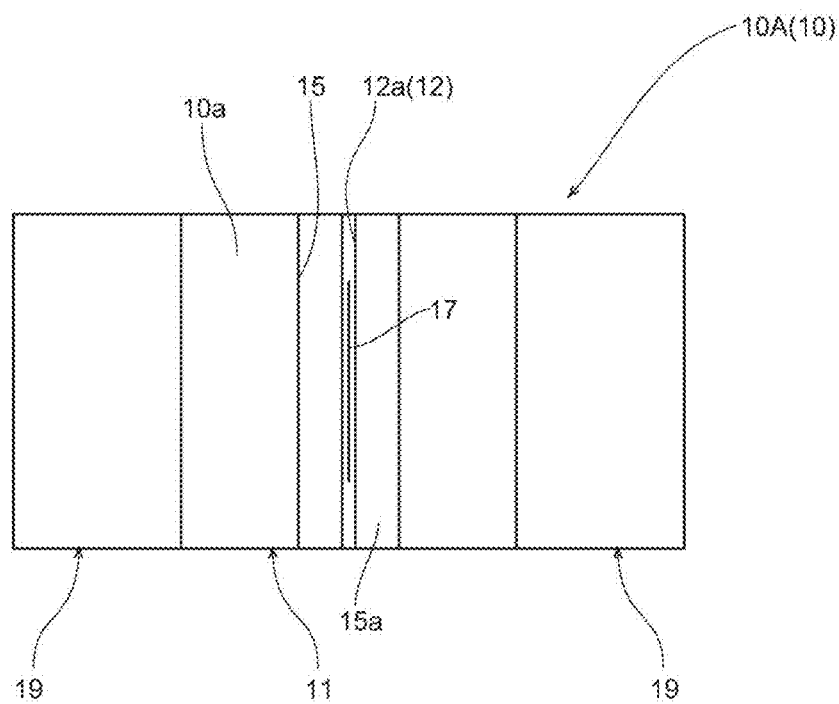
FIG. 8 is a plan view of the holder of the first embodiment.
Figure 9:
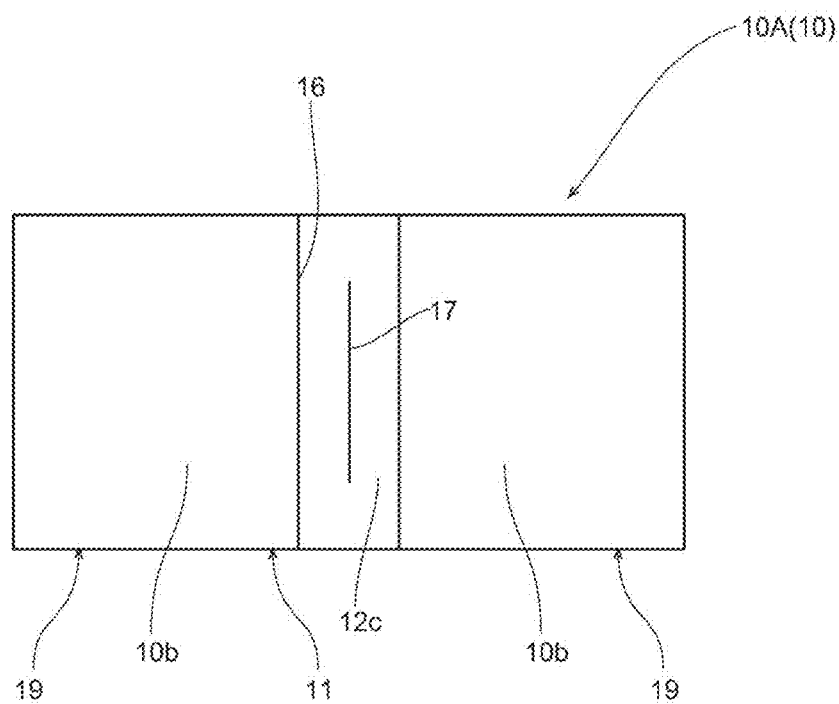
FIG. 9 is a bottom view of the holder of the first embodiment.
Figure 10:
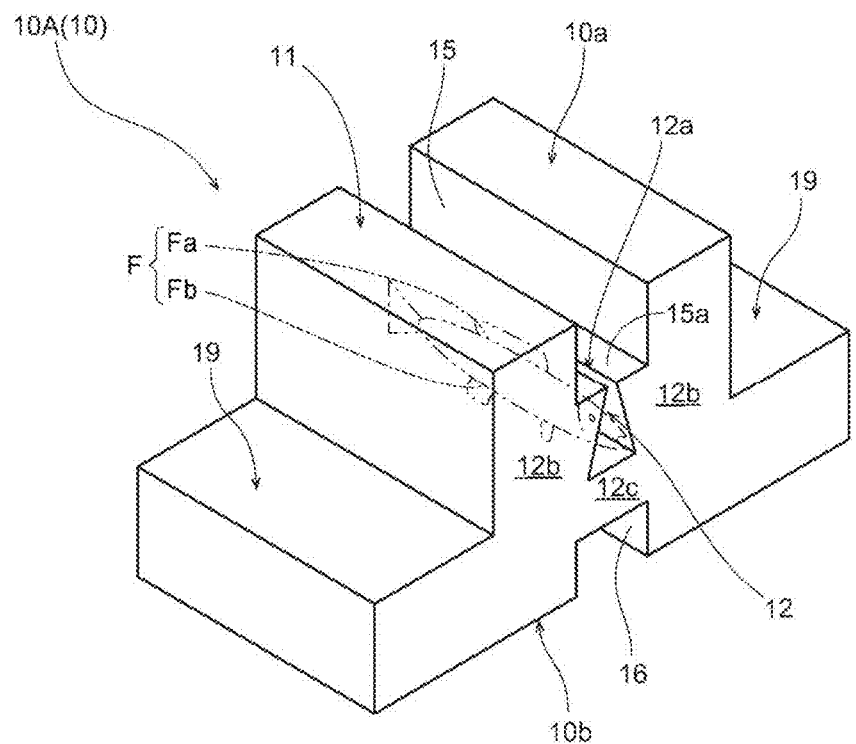
FIG. 10 is a perspective view of holder of the first embodiment.
Figure 11:
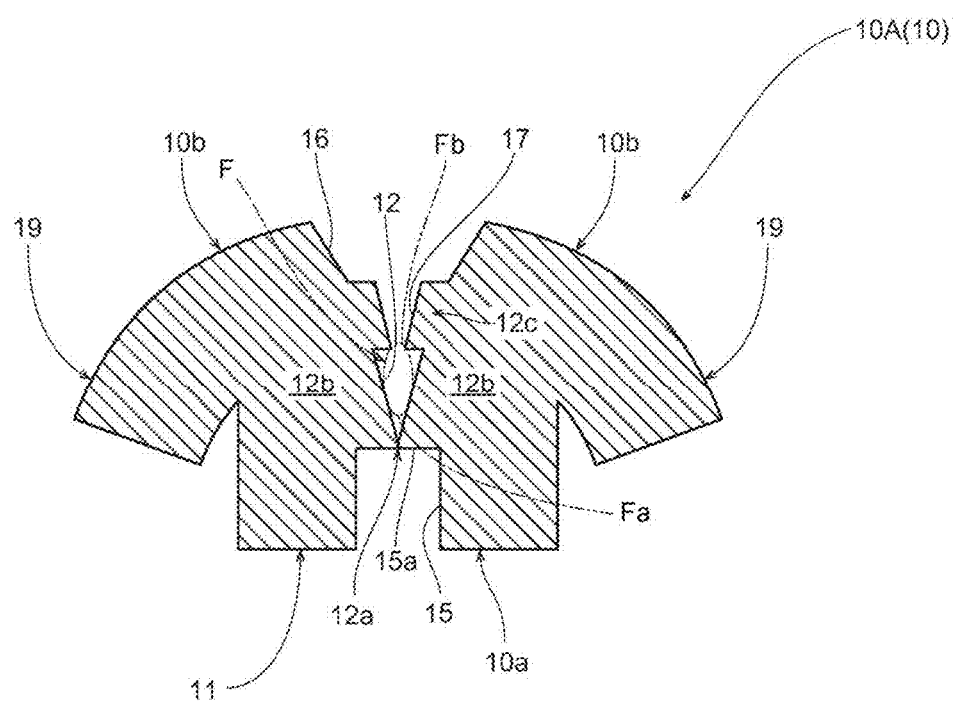
FIG. 11 is a front cross-sectional view of the holder of the first embodiment in which a top and a bottom are reversed after a side wing portion bending operation is performed.

The holder 10A of the first embodiment is illustrated in FIGS. 6 to 11. FIG. 6 is a front view of the holder 10A, FIG. 7 is a left side view of the holder 10A, FIG. 8 is a plan view of the holder 10A, FIG. 9 is a bottom view of the holder 10A, FIG. 10 is a perspective view of the holder 10A, and FIG. 11 is a front cross-sectional view of the holder 10A in which a top and a bottom are reversed after a side wing portion bending operation is performed. A right side view of the holder 10A is the same as a left side view (FIG. 7), and thus, is omitted. In addition, in FIG. 11, the top and the bottom of the holder 10A are in a reversed state. Therefore, the upper surface 10a side of the holder 10A is located on the lower side, and the lower surface 10b side of the holder 10A is located on the upper side.

Referring to a front view illustrated in FIG. 6, an overall size of the holder 10A of the present embodiment is approximately 50 mm in height in an up-down direction, approximately 100 mm in width in a left-right direction, and approximately 50 mm in thickness in a depth direction.

In addition, referring to the front view illustrated in FIG. 6, the size of the chute insertion recessed portion 15 formed on the upper surface 10a side of the holder 10A is approximately 15 mm in depth in the up-down direction, and is approximately 15 mm in width in the left-right direction.

In the holder 10A, as mainly illustrated in FIG. 6, the holding groove 12 is formed in a substantially isosceles triangular cross-sectional shape in which the opening portion 12a that is open in the bottom portion 15a of the chute insertion recessed portion 15 on the upper surface 10a side is a vertex. Referring to the front view in FIG. 6, the size of the holding groove 12 is approximately 15 mm in height in the up-down direction, and is 10 mm in width in the left-right direction of a bottom side.

In a state where the test fish F is held inside the holding groove 12 having the substantially isosceles triangular cross-sectional shape in which the opening portion 12a is the vertex, the width of the opening portion 12a on the upper surface 10a side is narrowed than the width of the space while the test fish F is gently held in a relatively wide space. In this manner, the test fish F is preferably prevented from falling from the opening portion 12a. For example, as illustrated in FIG. 11, even in a state where the top and the bottom of the holder 10 are reversed to perform the predetermined treatment on the abdomen Fb of the test fish F from above, the test fish F held inside the holding groove 12 is preferably prevented from falling from the opening portion 12a located on the lower side. Furthermore, when a user pinches the side wall portions 12b on both the left and right sides of the holding groove 12 from the outside with fingers, the test fish F can be more preferably prevented from the holding groove 12.

As mainly illustrated in FIG. 6, the holder 10A is formed to have a groove forming portion 11 in which the holding groove 12 is formed, and a pair of side wing portions 19 extending to both sides from a lower portion of both left and right side portions of the groove forming portion 11. Specifically, the side wing portions 19 having the width of approximately 25 mm extend to both left and right sides from each lower portion side of both left and right side portions of the groove forming portion 11 having the width of approximately 50 mm, and the lower surface of the groove forming portion 11 and the lower surface of the pair of side wing portions 19 are formed in the same planar shape. Furthermore, a position of the side wing portion 19 in the up-down direction is a position overlapping positions of the slit 17 and the bottom portion groove 16 in the groove forming portion 11, and the side wing portion 19 is located in a region from a lower end surface of the groove forming portion 11 to the height of approximately 20 mm.

As mainly illustrated in FIGS. 6 and 9, the holder 10A has the bottom portion groove 16 having a rectangular cross section extending along the front-rear direction and open downward on the lower surface 10b side of the holding groove 12. Referring to the front view in FIG. 6, the size of the bottom portion groove 16 is approximately 10 mm in depth in the up-down direction, and is approximately 15 mm in width in the left-right direction.

As mainly illustrated in FIGS. 6, 8, and 9, the slit 17 is formed in the bottom portion 12c of the holding groove 12 to cause the holding groove 12 and the bottom portion groove 16 to communicate with each other. Referring to the front view in FIG. 6, the slit 17 is formed in a cutout shape having the width of approximately 0 mm in the left-right direction. The size thereof is approximately 10 mm in depth in the up-down direction, which is the same as the thickness of the bottom portion 12c of the holding groove 12, and the length in the depth direction is approximately 30 mm. In the present embodiment, the slit 17 is formed in the cutout shape having the width of approximately 0 mm, but may be formed in a groove shape having the width of several mm.

That is, the bottom portion groove 16 is formed on the lower surface 10b side below the holding groove 12. In this manner, the thickness of the bottom portion 12c of the holding groove 12 decreases, and the depth of the slit 17 decreases. Therefore, a possibility that the slit 17 interferes with the predetermined treatment on the abdomen Fb of the test fish F through the slit 17 is suppressed.

The thickness of the bottom portion 12c which corresponds to the depth of the slit 17 can be appropriately set in view of easiness of widening the width of the slit 17 or durability of the bottom portion 12c. For example, when the holder 10 is formed of the sponge as in the present embodiment and the slit 17 having the length of 30 mm is formed in the bottom portion 10c, it is desirable that the thickness of the bottom portion 12c which corresponds to the depth of the slit 17 is set to be approximately 10 mm.

The user grips the holder 10A with one hand by pinching each outer end portion of the pair of side wing portions 19 with fingers. In a form in which each outer end portion of the pair of side wing portions 19 is moved to be close toward the upper surface 10a side of the groove forming portion 11, the side wing portion bending operation for bending the pair of side wing portions 19 is performed, and the top and the bottom of the holder 10A are reversed. Then, the holder 10A is brought into a state illustrated in FIG. 11.

That is, as illustrated in FIG. 11, when the side wing portion bending operation is performed on the holder 10A, a tensile force is generated from the inside toward the outside in the left-right direction on the lower surface 10b side (upper side in FIG. 11) in the groove forming portion 11, and a compressive force is generated from the outside in the left-right direction toward the inside on the upper surface 10a side (lower side in FIG. 11).

Therefore, when the side wing portion bending operation is performed in a state where the test fish F is held inside the holding groove 12 of the groove forming portion 11, the width of the holding groove 12 decreases due to the compressive force. In this manner, while the test fish F held inside the holding groove 12 is properly gripped by both side walls of the holding groove 12, the predetermined treatment can be more easily and reliably performed on the abdomen Fb of the test fish F held inside the holding groove 12 through the bottom portion groove 16 or the slit 17 whose width is widened by the tensile force.

Furthermore, the bottom portion groove 16 is formed on the lower surface 10b side below the holding groove 12, and the thickness of the bottom portion 12c of the holding groove 12 decreases. Therefore, the width of the slit 17 formed in the bottom portion 12c is likely to increase when the side wing portion bending operation is performed as illustrated in FIG. 11. Therefore, the predetermined treatment can be more easily and reliably performed on the abdomen Fb of the test fish F through the widened slit 17. In the side wing portion bending operation, strength for pinching each outer end portion of the pair of side wing portions 19 with the fingers can be appropriately set, and for example, the outer end portion may be more strongly pinched, compared to a state illustrated in FIG. 11. In this case, the width of the chute insertion recessed portion 15 located on the holding groove 12 and the upper surface 10a side further decreases, and integration between the holder 10 and the test fish F held inside the holding groove 12 is improved. Therefore, the test fish F is more firmly gripped.

Second Embodiment

Figure 12:
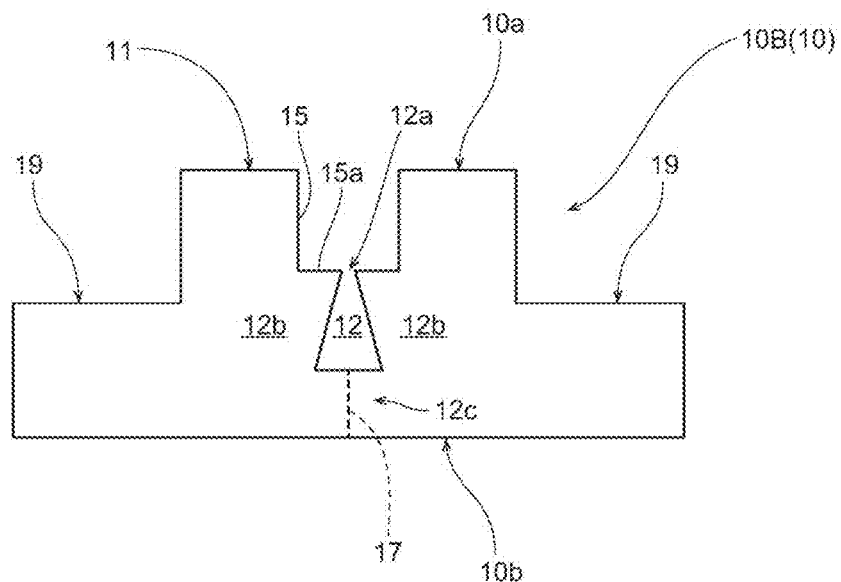
FIG. 12 is a front view of a holder of a second embodiment.
Figure 13:
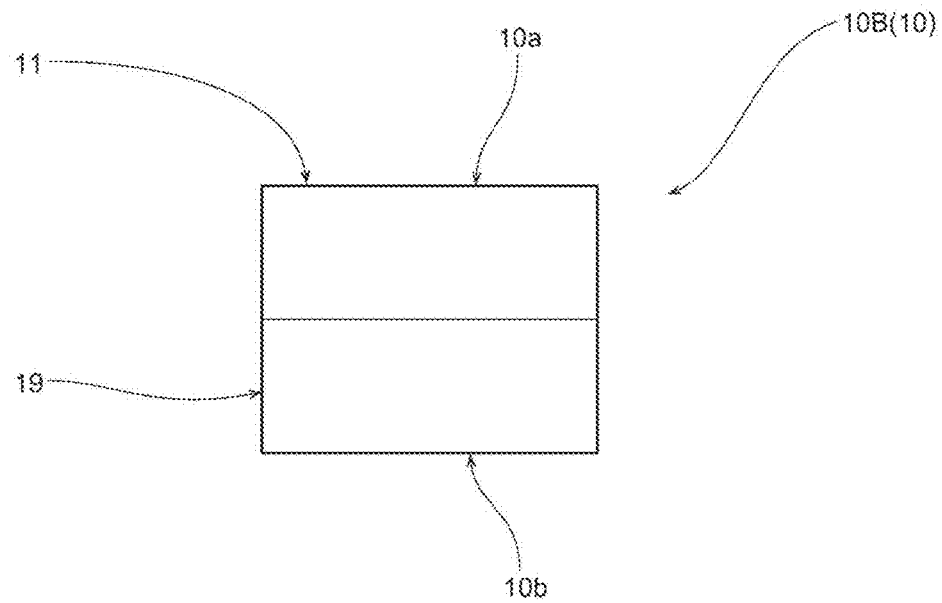
FIG. 13 is a left side view of the holder of the second embodiment.
Figure 14:
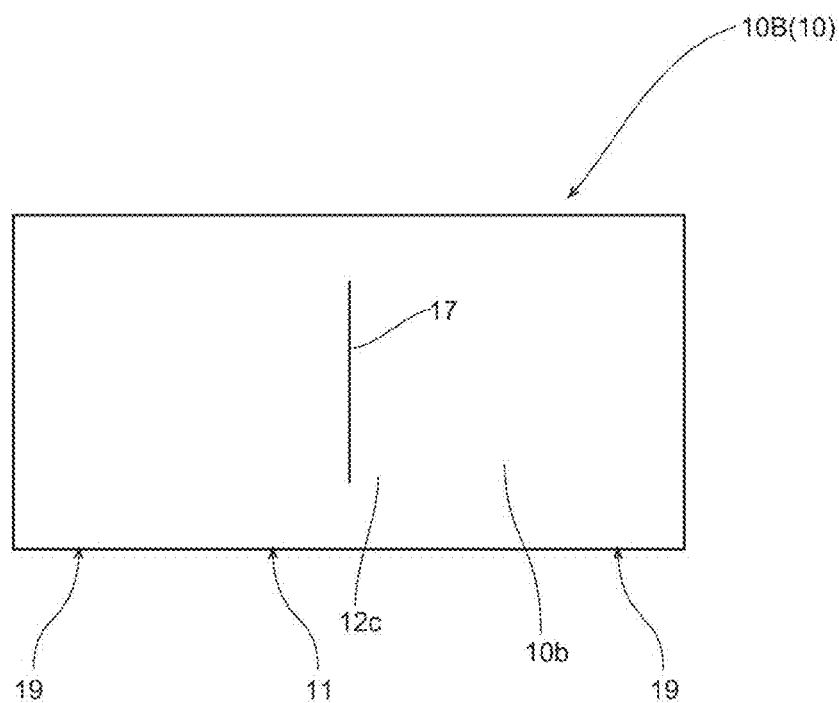
FIG. 14 is a bottom view of the holder of the second embodiment.
Figure 15:
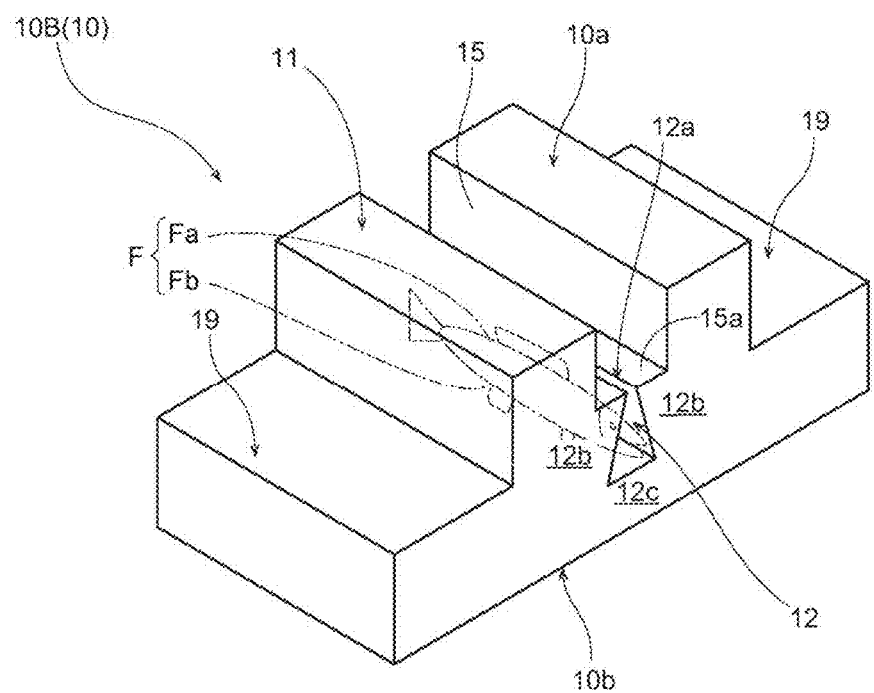
FIG. 15 is a perspective view of the holder of the second embodiment.
Figure 16:
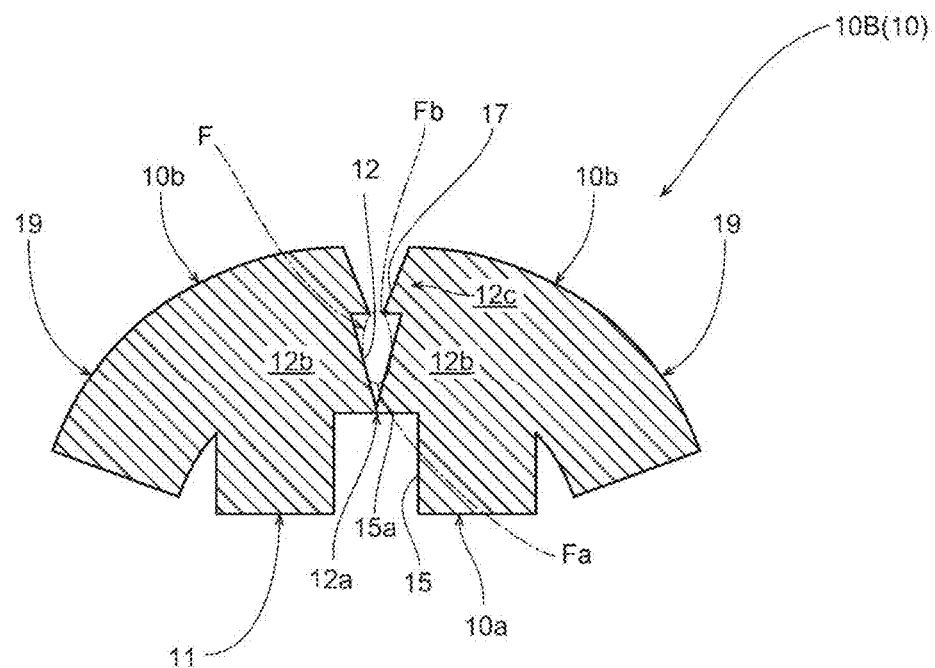
FIG. 16 is a front cross-sectional view of the holder of the second embodiment in which the top and the bottom are reversed after the side wing portion bending operation is performed.

FIGS. 12 to 16 illustrate a holder 10B according to a second embodiment. FIG. 12 is a front view of the holder 10B, FIG. 13 is a left side view of the holder 10B, FIG. 14 is a bottom view of the holder 10B, FIG. 15 is a perspective view of the holder 10B, and FIG. 16 is a front cross-sectional view of the holder 10B when the top and bottom are reversed after the side wing portion bending operation is performed. The right side view of the holder 10B is the same as the left side view (FIG. 13), and thus, is omitted. The plan view of the holder 10B is the same as the plan view (FIG. 8) of the holder 10A of the first embodiment, and thus, illustration is omitted. In addition, in FIG. 16, the top and the bottom of the holder 10B are in a reversed state. Therefore, the upper surface 10a side of the holder 10B is located on the lower side, and the lower surface 10b side of the holder 10B is located on the upper side.

A holder 10B (refer to FIGS. 12 to 16) of the present embodiment is common to the holder 10A (refer to FIGS. 6 to 11) of the first embodiment in that the overall width and the thickness, the size of the chute insertion recessed portion 15, the size of the holding groove 12, the width of the groove forming portion 11, the width and the height of both side wing portions 19, and the like are common, and both of these are different from each other in the overall height, the presence or absence of the bottom portion groove 16, and the like. In the following description, with regard to the same configurations as those of the first embodiment, detailed description may be omitted in some cases.

The holder 10B according to the present embodiment is different from the holder 10A according to the first embodiment in that the bottom portion groove 16 (refer to FIG. 6 and the like) is omitted, and the height of the groove forming portion 11 decreases accordingly.

That is, referring to the front view in FIG. 12, the lower surface 10b of the holder 10B according to the present embodiment is formed in a planar shape, and the slit 17 is provided in the holder 10B to be open on the lower surface 10b of the holder 10B. The height of the holder 10B according to the present embodiment is set to be approximately 40 mm obtained by subtracting the height of the bottom portion groove 16. A position of the side wing portion 19 in the up-down direction is a position overlapping with positions of a portion on the bottom portion 12c side of the holding groove 12 in the groove forming portion 11 and the slit 17. The side wing portion 19 is located in a region from the lower end surface of the groove forming portion 11 to the height of approximately 20 mm. The lower surface of the groove forming portion 11 in which the slit 17 is open and the lower surfaces of the pair of side wing portions 19 located on both sides are formed in the same planar shape.

In the present embodiment, in installing the holder 10B on the holder base 30, it is desirable that a sponge-made spacer having the thickness corresponding to the decreased height compared to the holder 10A of the first embodiment is interposed between the holder 10B and the bottom plate 31 of the holder base 30 such that a height position of the upper surface 10a is the same as that of the holder 10A of the first embodiment.

The user grips the holder 10B with one hand by pinching each outer end portion of the pair of side wing portions 19 with the fingers. In a form in which each outer end portion of the pair of side wing portions 19 is moved to be close toward the upper surface 10a side of the groove forming portion 11, the side wing portion bending operation for bending the pair of side wing portions 19 is performed, and the top and the bottom of the holder 10B are reversed. Then, the holder 10B is brought into a state illustrated in FIG. 16.

That is, as illustrated in FIG. 16, when the side wing portion bending operation is performed on the holder 10B, in the groove forming portion 11, the tensile force is generated from the inside toward the outside in the left-right direction on the lower surface 10b side (upper side in FIG.

16), and the compressive force is generated from the outside in the left-right direction to the inside on the upper surface 10a side (lower side in FIG. 16). The tensile force generated on the lower surface 10b side is directly applied to the slit 17 which is open on the lower surface 10b. In this manner, the width of the slit 17 is relatively largely widened.

Therefore, when the side wing portion bending operation is performed in a state where the test fish F is held inside the holding groove 12 of the groove forming portion 11, the width of the holding groove 12 decreases due to the compressive force. In this manner, while the test fish F held inside the holding groove 12 is properly gripped by both side walls of the holding groove 12, the predetermined treatment can be more easily and reliably performed on the abdomen Fb of the test fish F held inside the holding groove 12 through the slit 17 whose width is relatively largely widened by the tensile force.

Furthermore, in performing the predetermined treatment on the abdomen Fb of the test fish F through the slit 17 in this way, the bottom portion groove 16 (refer to FIG. 6 and the like) of the holder 10A according to the first embodiment is omitted. Therefore, the bottom portion groove 16 is avoided from interfering with the above-described treatment.

In addition, the holder 10B according to the present embodiment has a simplified shape by omitting the bottom portion groove 16, compared to the holder 10A according to the first embodiment. In this manner, for example, when the rectangular parallelepiped sponge is cut to manufacture the holder 10B according to the present embodiment, the number of cut locations decreases. As a result, manufacturing costs are reduced, damage to the side wing portion bending operation is suppressed, and durability is improved.

Third Embodiment

Figure 17:
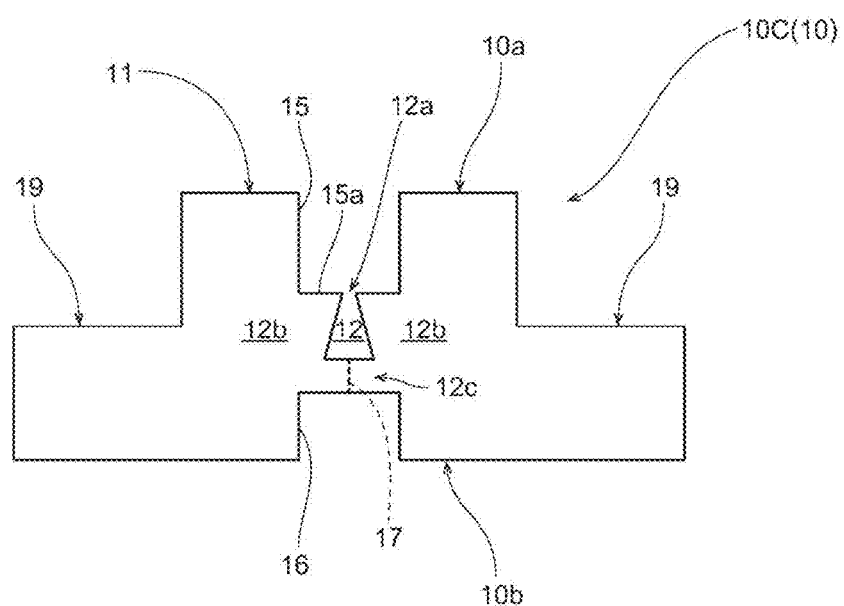
FIG. 17 is a front view of a holder of a third embodiment.
Figure 18:
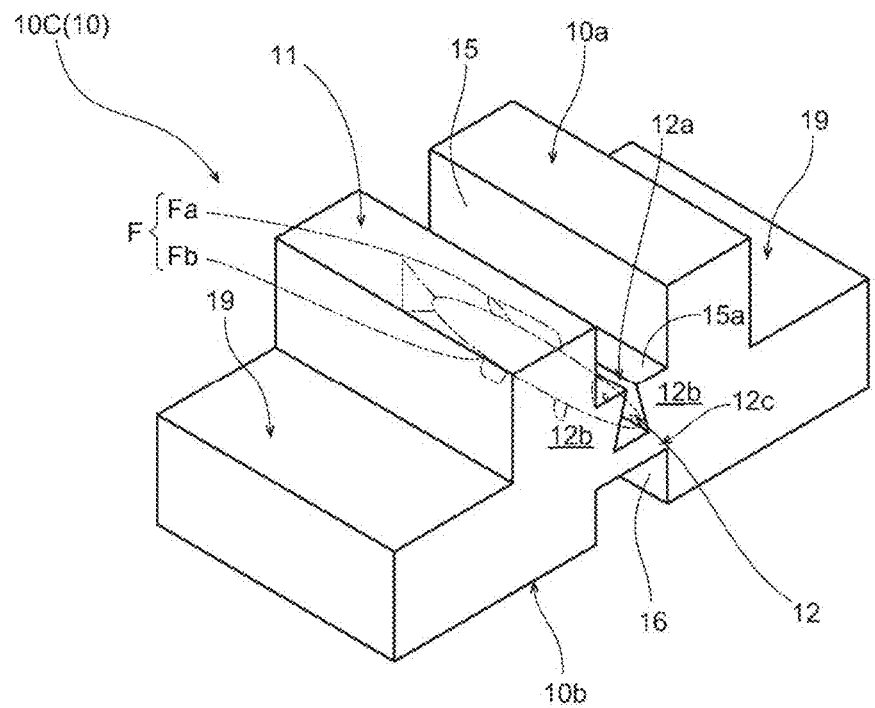
FIG. 18 is a perspective view of the holder of the third embodiment.
Figure 19:
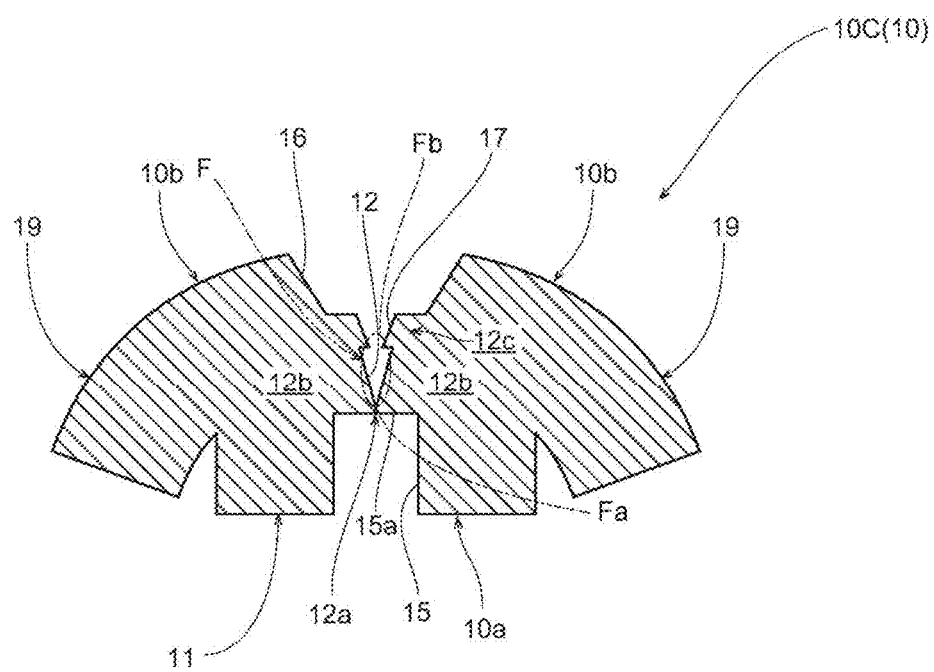
FIG. 19 is a front cross-sectional view of the holder of the third embodiment in which the top and the bottom are reversed after the side wing portion bending operation is performed.

FIGS. 17 to 19 illustrate a holder 10C according to a third embodiment. FIG. 17 is a front view of the holder 10C, FIG. 18 is a perspective view of the holder 10C, and FIG. 19 is a front cross-sectional view of the holder 10C when the top and the bottom are reversed after the side wing portion bending operation is performed. The left side view and the right side view of the holder 10C are the same as the left side view (FIG. 13) of the holder 10B according to the second embodiment, and thus, is omitted. The plan view of the holder 10C is the same as the plan view (FIG. 8) of the holder 10A of the first embodiment, and thus, is omitted. The bottom view of the holder 10C is the same as the bottom view (FIG. 9) of the holder 10A of the first embodiment, and thus, is omitted. In addition, in FIG. 19, the top and the bottom of the holder 10C are in a reversed state. Therefore, the upper surface 10a side of the holder 10C is located on the lower side, and the lower surface 10b side of the holder 10C is located on the upper side.

While the holder 10C (refer to FIGS. 17 to 19) of the present embodiment is common to the holder 10A (refer to FIGS. 6 to 11) of the first embodiment in that the overall width and the thickness, the size of the chute insertion recessed portion 15, the size of the bottom portion groove 16, the width of the groove forming portion 11, the width and the height of both side wing portions 19, and the like are the same, both of these holders are different from each other in the overall height, the size of the holding groove 12, the depth of the slit 17 (thickness of the bottom portion 12c), and the like. In the following description, with regard to the same configurations as those of the first embodiment, detailed description may be omitted in some cases.

Although details will be described later, the holder 10C of the present embodiment is different from the holder 10A of the first embodiment in that the height of the holding groove 12 and the depth of the slit 17 (thickness of the bottom portion 12c) decrease, and the height of the groove forming portion 11 decreases accordingly.

That is, referring to the front view in FIG. 17, the height of the holder 10C of the present embodiment is approximately 40 mm obtained by subtracting a decreased amount of the height of the holding groove 12 and the depth of the slit 17 (thickness of the bottom portion 12c). A position of the side wing portion 19 in the up-down direction is a position overlapping positions of a portion on the bottom portion 12c side of the holding groove 12 in the groove forming portion 11, the slit 17, and the bottom portion groove 16, and the side wing portion 19 is located in a region from the lower end surface of the groove forming portion 11 to the height of approximately 20 mm.

In the present embodiment, in installing the holder 10C on the holder base 30, it is desirable that a sponge-made spacer having the thickness corresponding to the decreased height compared to the holder 10A of the first embodiment is interposed between the holder 10C and the bottom plate 31 of the holder base 30 such that the height position of the upper surface 10a is the same as that of the holder 10A of the first embodiment.

As mainly illustrated in FIG. 17, the holding groove 12 of the holder 10C of the present embodiment is formed to have the substantially isosceles triangular cross-sectional shape similar to that of the first embodiment, but is formed to be smaller than that of the first embodiment. That is, in the holder 10C, referring to the front view in FIG. 17, the size of the holding groove 12 is approximately 10 mm in height in the up-down direction, and is approximately 5 mm in width in the left-right direction of the bottom side.

In addition, the depth of the slit 17 (thickness of the bottom portion 12c) is also approximately 5 mm which is smaller than that in the first embodiment, and a possibility that the slit 17 interferes with the predetermined treatment on the abdomen Fb of the test fish F through the slit 17 is further suppressed.

The user grips the holder 10C with one hand by pinching each outer end portion of the pair of side wing portions 19 with the fingers. In a form in which each outer end portion of the pair of side wing portions 19 is moved to be close toward the upper surface 10a side of the groove forming portion 11, the side wing portion bending operation for bending the pair of side wing portions 19 is performed, and the top and the bottom of the holder 10C are reversed. Then, the holder 10C is brought into a state illustrated in FIG. 19.

That is, as illustrated in FIG. 19, when the side wing portion bending operation is performed on the holder 10C, the tensile force is generated from the inside toward the outside in the left-right direction on the lower surface 10b side (upper side in FIG. 19) in the groove forming portion 11, and the compressive force is generated from the outside in the left-right direction toward the inside on the upper surface 10a side (lower side in FIG. 19).

Therefore, when the side wing portion bending operation is performed in a state where the test fish F is held inside the holding groove 12 of the groove forming portion 11, the width of the holding groove 12 decreases due to the compressive force. In this manner, while the test fish F held inside the holding groove 12 is properly gripped by both side walls of the holding groove 12, the predetermined treatment can be more easily and reliably performed on the abdomen Fb of the test fish F held inside the holding groove 12 through the bottom portion groove 16 or the slit 17 whose width is widened by the tensile force.

[Intraperitoneal Administration and Intraperitoneal Administration Tool Used Therefor]

As embodiments of a predetermined process and an intraperitoneal administration tool according to the present disclosure, the intraperitoneal administration using the holder 10 of the test fish holding device 1 described above and the intraperitoneal administration tool used therefor will be described in detail with reference to the drawings.

As illustrated in FIG. 20, while the test fish F is reliably held in a predetermined posture by suppressing damage inside the holding groove 12 of the holder 10 as much as possible, the top and the bottom of the holder 10 are reversed. In this manner, the predetermined treatment is performed on the abdomen Fb of the test fish F held inside the holding groove 12 through the slit 17 from the upper side.

In the present embodiment, as the predetermined treatment, the intraperitoneal administration is performed by administering a target substance into an abdominal cavity of the test fish F through an injection needle 52 in a state where the injection needle 52 is inserted into the abdomen Fb of the test fish F. As the target substance, any target substance such as an experimental test substance and a therapeutic drug can be used.

In this intraperitoneal administration, for example, the injection needle 52 is inserted into a location slightly shifted from an anus in the abdomen Fb of the test fish F at a predetermined reference insertion angle As and a reference insertion depth Ds. Then, a tip of the injection needle 52 properly reaches the abdominal cavity of the test fish F, and the target substance can be administered into the abdominal cavity through the injection needle 52.

Figure 21:
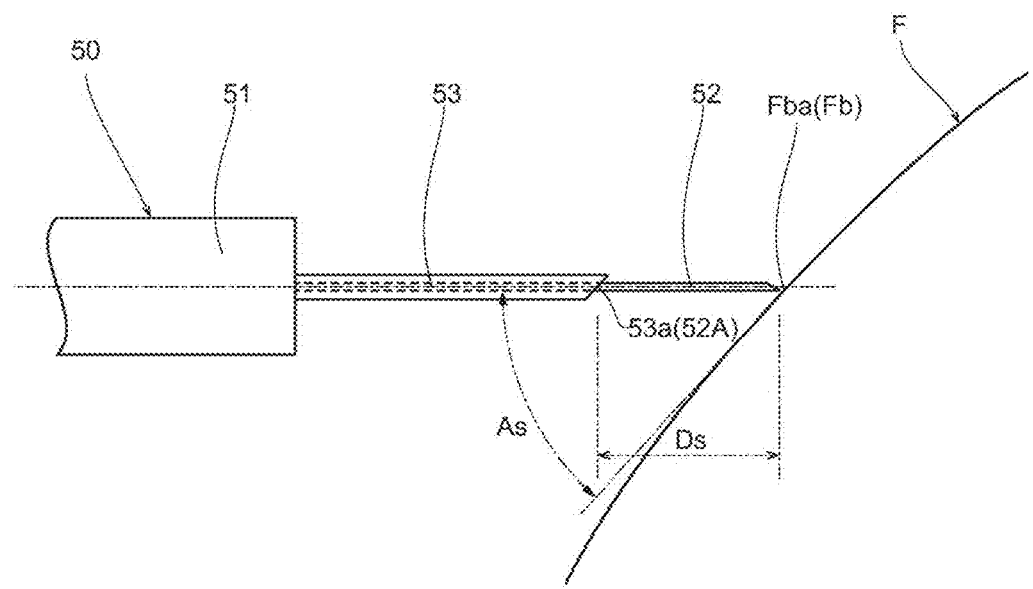
FIG. 21 is a partially enlarged view illustrating a state of the intraperitoneal administration tool immediately before the intraperitoneal administration.
Figure 22:
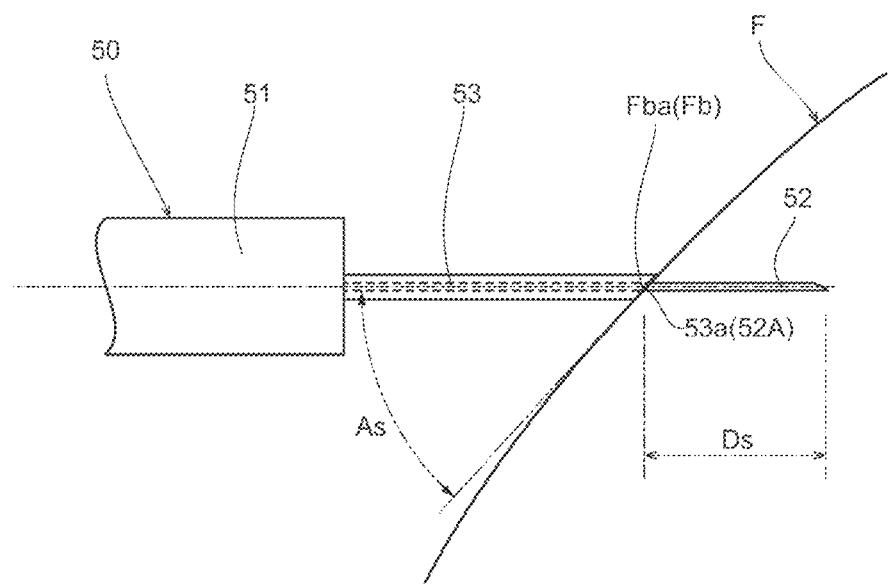
FIG. 22 is a partially enlarged view illustrating a state of the intraperitoneal administration tool during the intraperitoneal administration.

As illustrated in FIGS. 21 and 22, the test fish intraperitoneal administration tool 50 for performing the intraperitoneal administration includes a syringe 51 filled with the target substance and the injection needle 52 through which the target substance supplied from the syringe 51 flows out from a tip thereof.

Furthermore, the test fish intraperitoneal administration tool 50 adopts a configuration for simply performing a stable intraperitoneal administration on the test fish F at all times while reliably reducing the burden on the test fish F which is caused by an error between an actual insertion depth of the injection needle 52 into the abdomen Fb of the test fish F and the reference insertion depth Ds, and the configuration will be described below.

The outer peripheral portion of the injection needle 52 is provided with an insertion depth guide portion 52A that comes into contact with an abdominal surface Fba of the test fish F when the injection needle 52 is inserted into the abdomen Fb of the test fish F at the predetermined reference insertion depth Ds during the intraperitoneal administration (refer to FIG. 22). Specifically, a tubular guide member 53 is externally fitted to a base end portion of the injection needle 52. When the injection needle 52 is inserted into the abdomen Fb of the test fish F at the predetermined reference insertion depth Ds during the intraperitoneal administration, a tip surface 53a of the guide member 53 functions as the insertion depth guide portion 52A in a form of abutting on the abdominal surface Fba of the test fish F.

Furthermore, the tip surface 53a of the guide member 53 is an inclined surface which is parallel to the abdominal surface Fba of the test fish F when the injection needle 52 is inserted into the abdomen Fb of the test fish F at the predetermined reference insertion angle As during the intraperitoneal administration (refer to FIG. 22).

According to this configuration, as illustrated in FIG. 21, when the user inserts the injection needle 52 into the abdomen Fb of the test fish F, the user keeps the posture of the syringe 51 such that the tip surface 53a of the guide member 53 is parallel to the abdominal surface Fba of the test fish F. In this manner, the user can clearly recognize that the injection needle 52 is inserted into the abdomen Fb of the test fish F at the proper reference insertion angle As.

Furthermore, as illustrated in FIG. 22, when the user inserts the injection needle 52 into the abdomen Fb of the test fish F during the intraperitoneal administration, the tip surface 53a of the guide member 53 abuts on the abdomen Fb of the test fish F as the insertion depth guide portion 52A. In this manner, the user can recognize that the injection needle 52 is inserted into the abdomen Fb of the test fish F at the proper reference insertion depth Ds.

Therefore, the stable intraperitoneal administration can be simply performed on the test fish F at all times while reliably reducing the burden on the test fish F which is caused by the error between the actual insertion angle or the actual insertion depth of the injection needle 52 into the abdomen Fb of the test fish F and the reference insertion angle As or the reference insertion depth Ds.

In the present embodiment, the tip surface 53a of the guide member 53 serves as the insertion depth guide portion 52A. However, for example, the guide member 53 may be omitted, and a colored portion, a stamped portion, a groove portion, or the like provided in the outer peripheral portion of the injection needle 52 may function as the insertion depth guide portion 52A. In this case, an entire range where the guide member 53 is provided in the outer peripheral portion of the injection needle 52 in the present embodiment may be colored, and the tip portion may function as the insertion depth guide portion 52A.

In addition, when the colored portion of the outer peripheral portion of the injection needle 52 functions as the insertion depth guide portion 52A, the colored portion can adopt a form such as a linear shape parallel to the abdominal surface Fba of the test fish F when the injection needle 52 is inserted into the abdomen Fb of the test fish F at the predetermined reference insertion angle As during the intraperitoneal administration.

Other Embodiments

Other embodiments of the present disclosure will be described. Configurations of individual embodiments described below are not limited to a single application, and applications in combination with configurations of another embodiment can also be adopted.

(1) In the holder 10 according to the above-described embodiments, the pair of side wing portions 19 is provided to extend from the lower portion side to both sides of both left and right side portions of the groove forming portion 11 in which the holding groove 12 is formed. However, the side wing portions 19 is dispensable.

(2) In the holder 10 according to the above-described embodiments, the holding groove 12 having the substantially isosceles triangular cross-sectional shape in which the opening portion 12a is the vertex is provided. However, the holding groove having a different cross-sectional shape such as an ellipse or a rectangle may be provided.

(3) In the above-described embodiments, an example has been described in which the intraperitoneal administration using the test fish intraperitoneal administration tool 50 is performed as the treatment method for the test fish F on which the predetermined treatment is performed on the abdomen Fb of the test fish F by using the test fish holding device 1. However, the predetermined treatment may be any treatment performed on the abdomen Fb of the test fish F. For example, another treatment other than the intraperitoneal administration, such as an observation of the abdomen Fb of the test fish F, may be performed.

(4) In the test fish intraperitoneal administration tool 50 of the above-described embodiments, the tip surface 53*a* of the guide member 53 is the inclined surface parallel to the abdominal surface Fba of the test fish F during the intraperitoneal administration. However, the inclined angle or the shape of the tip surface 53*a* of the guide member 53 can be appropriately changed.

INDUSTRIAL APPLICABILITY

The present disclosure can be preferably used for a test fish holding device including a holder having a flexible holding groove internally holding a test fish, and a test fish treatment method for performing a predetermined treatment on an abdomen of the test fish by using the test fish holding device. The test fish holding device and the test fish treatment method can properly perform the predetermined treatment on the abdomen of the test fish while reliably holding the test fish in a predetermined posture by suppressing damage as much as possible.

REFERENCE SIGNS LIST

1: test fish holding device
10: holder
10A: holder
10B: holder
10C: holder
10*a*: upper surface side
10*b*: lower surface side
11: groove forming portion
12: holding groove
12*a*: opening portion
12*c*: bottom portion
16: bottom portion groove
17: slit
19: side wing portion
50: test fish intraperitoneal administration tool
51: syringe
52: injection needle
52A: insertion depth guide portion
53: guide member
53*a*: tip surface
As: reference insertion angle
Ds: reference insertion depth
F: test fish
Fb: abdomen
Fba: abdominal surface

The invention claimed is:

1. A test fish holding device comprising:
   a flexible holder comprising a holding groove extending along a front-rear direction on an upper surface side thereof and internally holding a test fish loaded from an upper opening portion,
   wherein the holder has a slit extending along the front-rear direction in a bottom portion of the holding groove and exposing an abdomen of the test fish held inside the holding groove on a lower surface side thereof,
   the slit is formed in a cutout shape, the slit having a width of approximately 0 mm in a left-right direction, and
   the width of the slit is widened by generating a tensile force from an inside toward an outside on the lower surface side of the holder.

2. The test fish holding device according to claim 1, wherein the holder is formed to have a groove forming portion in which the holding groove is formed, and a pair of side wing portions extending from a lower portion side to both sides of both left and right side portions of the groove forming portion.

3. The test fish holding device according to claim 1, wherein a lower surface of the holder is formed in a planar shape, and
   the slit is provided to be open on the lower surface of the holder.

4. The test fish holding device according to claim 1, wherein the holding groove is formed to have a substantially isosceles triangular cross-sectional shape in which an opening portion is a vertex.

5. A test fish treatment method for performing a predetermined treatment on an abdomen of a test fish by using the test fish holding device according to claim 1, the method comprising:
   holding the test fish inside the holding groove of the holder; and
   performing the predetermined treatment on the abdomen of the test fish held inside the holding groove through the slit from the lower surface side of the holder.

6. The test fish treatment method according to claim 5, further comprising
   performing an intraperitoneal administration, by using a test fish intraperitoneal administration tool comprising a syringe filled with a target substance and an injection needle through which the target substance supplied from the syringe flows out from a tip, for administering the target substance into an abdominal cavity of the test fish through the injection needle, as the predetermined treatment, in a state where the injection needle is inserted into the abdomen of the test fish held inside the holding groove of the holder,
   wherein the injection needle is provided with an insertion depth guide portion in an outer peripheral portion of the injection needle, the insertion depth guide portion coming into contact with an abdominal surface of the test fish when the injection needle is inserted into the abdomen of the test fish at a predetermined reference insertion depth during the intraperitoneal administration.

7. The test fish treatment method according to claim 6, wherein
   the insertion depth guide portion in the outer peripheral portion of the injection needle is provided in a form where the insertion depth guide portion is parallel to the abdominal surface of the test fish when the injection needle is inserted into the abdomen of the test fish at a predetermined reference insertion angle during the intraperitoneal administration.

* * * * *